United States Patent
Charbonneau et al.

(10) Patent No.: US 7,114,904 B2
(45) Date of Patent: Oct. 3, 2006

(54) PUSH-BACK PALLET STORAGE SYSTEM

(75) Inventors: Pierre Charbonneau, Montréal (CA); Jonathan Vallée, Verdun (CA)

(73) Assignee: C.O.S.M.E. Inc., Lasalle (CA)

( * ) Notice: Subject to any disclaimer, the term of this patent is extended or adjusted under 35 U.S.C. 154(b) by 454 days.

(21) Appl. No.: 10/663,731

(22) Filed: Sep. 17, 2003

(65) Prior Publication Data
US 2004/0069181 A1   Apr. 15, 2004

Related U.S. Application Data

(60) Provisional application No. 60/415,266, filed on Sep. 20, 2002.

(51) Int. Cl.
*B65G 1/10*  (2006.01)

(52) U.S. Cl. .................. 414/276; 211/59.2

(58) Field of Classification Search .......... 414/276, 414/267; 211/59.2; 104/244
See application file for complete search history.

(56) References Cited

U.S. PATENT DOCUMENTS

| | | | |
|---|---|---|---|
| 293,451 A | | 2/1884 | Grosscup |
| 316,969 A * | | 5/1885 | High ................... 182/36 |
| 828,459 A | | 8/1906 | Clark |
| 2,541,514 A * | | 2/1951 | Herold ............... 295/8.5 |
| 4,131,046 A * | | 12/1978 | Strohmeyer .......... 83/471.2 |
| 4,209,379 A * | | 6/1980 | Freeman et al. ...... 204/198 |
| 4,245,561 A | | 1/1981 | Krug |
| 4,965,940 A | | 10/1990 | Wilson |
| 5,141,118 A * | | 8/1992 | Gay ................... 211/151 |
| 5,482,422 A * | | 1/1996 | Hammond ........... 414/276 |
| 5,524,776 A * | | 6/1996 | Hall et al. ........... 211/151 |
| 5,735,214 A | | 4/1998 | Tsuboi |
| 6,129,223 A * | | 10/2000 | Krummell, Jr. ...... 211/151 |
| 6,158,943 A * | | 12/2000 | Sullivan ............. 414/286 |
| 6,851,562 B1 * | | 2/2005 | Gorniak et al. ....... 211/59.2 |

FOREIGN PATENT DOCUMENTS

CA  2098433  4/1995

* cited by examiner

*Primary Examiner*—Eileen D. Lillis
*Assistant Examiner*—Charles A. Fox
(74) *Attorney, Agent, or Firm*—Francois Martineau (57) ABSTRACT

The push-back storage system includes an elongated storing lane defining opposite front and rear ends and at least one pair of spaced-apart parallel elongated rails extending between the front and rear ends of the storing lane and being inclined downwardly from the rear end towards the front end. Each rail includes a pair of elongated inclined side walls integrally linked at a common elongated top edge. At least one cart is rollably carried by the pair of rails and is rollable along the pair of rails between the storing lane front and rear ends, the cart having a load-bearing frame rollably carrying a number of wheels each engaging a corresponding one of the rails. Each wheel has a web rotatable about a rotational axis and a pair of side flanges radially extending from and axially spaced-apart along the wheel web so as to define a rail-engaging surface on the wheel web between the spaced-apart side flanges. The rail-engaging surface is wider than the top edge of the corresponding rail.

16 Claims, 7 Drawing Sheets

PUSH-BACK PALLET STORAGE SYSTEM

CROSS-REFERENCE DATA

The present patent application claims the conventional priority under the Paris Convention of co-pending provisional patent application No. 60/415,266 filed on Sep. 20, 2002 naming the present inventors.

FIELD OF THE INVENTION

The present invention relates to storage systems, and more particularly to a push-back storage system comprising a number of storing lanes each having carts rollingly mounted on rails within the storing lane that allow article-loaded pallets to be sequentially stored within the storing lane on respective carts and to be retrieved in a last-in first-out order.

BACKGROUND OF THE INVENTION

For archiving facilities, warehouses, or companies having large amounts of articles to store, storage optimization is of utmost importance. Trying to reduce the amount of unused potential storage space in these facilities is a common concern.

Rudimentary storage racks having three, four, or more shelves or levels are used as storage means in some warehouses or the like facilities. These racks can support a certain number of palletized articles. Forklift vehicles are used to install palletized articles on the shelves of the racks.

Development directed towards storage optimization has led to more sophisticated storage systems. In particular, a known optimized storing system is the so-called push-back storage system. These push-back storage systems have a series of elongated storing lanes, the frontmost end of each lane defining a forklift access opening. Each lane comprises a number of frontwardly inclined pairs of rails and a number of carts each engaging a corresponding pair of rails. The pairs of rails are arranged in the following manner: the first or innermost pair of rails is the narrowest, and also vertically projects above the level of the other pairs of rails. The second and following pairs of rails are gradually wider and vertically lower than each preceding pair of rails. Each pair of rails is engaged by a corresponding cart which may roll therealong between a frontmost position near the forklift access opening, and a rearmost position away from the forklift access opening. The first cart engaging the innermost pair of rails is the narrowest, and the other carts are gradually wider than the preceding cart. A front stop member prevents the carts from rolling along the frontwardly downwardly inclined rails beyond the forklift access opening.

To store a first article-loaded pallet on such a storage system, the forklift places through the forklift access opening the article-loaded pallet over the vertically topmost and narrower cart. The first pallet is prevented from rolling beyond the forklift access opening under its own weight, by the abutment of its cart against the front stop member. Then, after having picked-up a second item-loaded pallet, the forklift horizontally pushes this second pallet against the first pallet, the latter being pushed back, with its cart rearwardly rolling along its corresponding first pair of rails against the rearwardly upward inclination of the rails, until the second topmost cart is cleared to allow the second pallet to be placed thereon. The second pallet, located near the forklift access opening, now abuts against the front stop member under its own weight and due to the frontwardly inclined rails, and the first pallet abuts against the second pallet.

This process can then be repeated until all carts are full: each new pallet comes to rest on the topmost available cart, after the preceding pallet-loaded carts have been pushed back up along the inclined rails.

To unload the pallets from the storage system, the pallets are recuperated by the forklift truck in a last-in first-out order. Thus, the frontmost article-loaded pallet is first retrieved, and by doing so, all the other stacked pallets are allowed to advance towards the forklift access opening, allowing a new frontmost pallet to be available at the storing lane forklift access opening. This advancement of the pallets towards the front end of the storage rack lane occurs automatically under their own weight by the rolling engagement of their respective carts on the inclined rails.

In push-back storage systems such as the one described hereinabove, the carts can support very heavy loads, and their movement about the rail assembly will often be significantly hampered by friction. Prior art storage systems comprise lanes that are longitudinally inclined at a 2° or 3° angle or more, to defeat the action of friction-borne forces resulting from the rolling engagement of the carts on the rails, and to allow the carts to readily roll towards the forklift access opening of the lane under the action of gravity-borne forces. These prior art rail inclination angles do not allow the use of storage systems having longer rails allowing a greater number of pallets to be loaded thereon, since the weight of the palletized articles will become too important to allow the forklift truck to push a greater number of pallets back when an additional article-loaded pallet is to be stored.

Also, prior art rails present flat top surfaces that do not prevent accumulation of macroparticulate debris thereover. This debris may eventually hinder or prevent the rolling engagement of the carts on the rails.

SUMMARY OF THE INVENTION

The present invention relates to a push-back storage system comprising:
- an elongated storing lane defining opposite front and rear ends;
- at least one pair of spaced-apart parallel elongated rails extending between said front and rear ends of said storing lane and being inclined downwardly from said rear end towards said front end, each said rail comprising a pair of elongated inclined side walls integrally linked at a common elongated top edge; and
- at least one cart rollably carried by said pair of rails and rollable along said pair of rails between said storing lane front and rear ends, said cart comprising a load-bearing frame rollably carrying a number of wheels each engaging a corresponding one of said rails, each said wheel comprising a web rotatable about a rotational axis and a pair of side flanges radially extending from and axially spaced-apart along said wheel web so as to define a rail-engaging surface on said wheel web between said spaced-apart side flanges, said web rail-engaging surface being wider than said top edge of said corresponding rail so as to allow a low-friction rolling engagement between said wheel web and said rail top edge.

In one embodiment, said side flanges of each one of said wheels are inclined so as to form a divergent peripheral channel in said wheel with said wheel web, so as to accommodate said inclined side walls of the corresponding said rail, with a play existing between said inclined side walls of said corresponding rail and said wheel side flanges in at least one position of said wheel when it engages said corresponding rail.

In one embodiment, each said rail has a diamond-shaped cross-section.

In one embodiment, said frame of said at least one cart is U-shaped and defines a pair of spaced-apart longitudinal girders integrally linked by a front cross-bar at one extremity of said girders.

In one embodiment, said push-back storage system further comprises a second cart in addition to said at least one cart, said second cart being rollably carried by said pair of rails and rollable along said pair of rails between said storing lane front and rear ends, said second cart comprising:

a load-bearing frame rollably carrying a number of wheels each engaging a corresponding one of said rails, each said wheel comprising a web rotatable about a rotational axis and a pair of side flanges radially extending from and axially spaced-apart along said wheel web so as to define a rail-engaging surface on said wheel web between said spaced-apart side flanges, said web rail-engaging surface being wider than said top edge of said corresponding rail so as to allow a low-friction rolling engagement between said wheel web and said rail top edge;

wherein at least one wheel of said second cart engages one of said rails between two wheels of said at least one cart, and wherein said load-bearing frame of said second cart extends vertically lower than said load-bearing frame of said first cart.

In one embodiment, said push-back storage system further comprises a stop member at said storing lane front end for abutment of said at least one cart thereon when said at least one cart is at said storing lane front end for preventing said at least one cart from rolling beyond said storing lane front end.

The present invention also relates to a push-back storage system comprising:

an elongated storing lane defining opposite front and rear ends;

a first pair of spaced-apart parallel elongated rails extending between said front and rear ends of said storing lane and being downwardly inclined from said rear end towards said front end, and a second pair of spaced-apart parallel elongated rails extending parallel to said first pair of rails between a first position at said front end of said storing lane and a second position located away from said front end towards said rear end of said storing lane, said second pair of rails being downwardly inclined from said second position towards said first position, each said rail of said first and second pairs of rails comprising a pair of elongated inclined side walls integrally linked at a common elongated top edge; and a first cart rollably carried by said first pair of rails and rollable along said first pair of rails between said storing lane front and rear ends, and a second cart carried by said second pair of rails and rollable along said second pair of rails between said first and second positions, each one of said first and second carts comprising a load-bearing frame rollably carrying a number of wheels each engaging a corresponding one of said rails, each said wheel comprising a web rotatable about a rotational axis and a pair of side flanges radially extending from and axially spaced-apart along said wheel web so as to define a rail-engaging surface on said wheel web between said spaced-apart side flanges, said web rail-engaging surface being wider than said top edge of said corresponding rail so as to allow a low-friction rolling engagement between said wheel web and said rail top edge;

wherein said first pair of rails is located between said second pair of rails, with said load-bearing frame of said first cart extending vertically higher than said load-bearing frame of said second cart when said first and second carts respectively engage said first and second pairs of rails.

In one embodiment, said side flanges of each one of said wheels are inclined so as to form a divergent peripheral channel in said wheel with said wheel web, so as to accommodate said inclined side walls of the corresponding said rail, with a play existing between said inclined side walls of said corresponding rail and said wheel side flanges in at least one position of said wheel when it engages said corresponding rail.

In one embodiment, said first pair of rails is vertically higher than said second pair of rails at any given longitudinal position in said storing lane.

In one embodiment, said load-bearing frame of each of said first and second carts is U-shaped and defines a pair of spaced-apart longitudinal girders integrally linked by a front cross-bar at one extremity of said girders.

In one embodiment, said push-back storage system further comprises a third cart rollably carried by said first pair of rails and rollable along said first pair of rails between said storing lane front and rear ends, and a fourth cart rollably carried by said second pair of rails and rollable along said second pair of rails between said first and second position, each one of said third and fourth carts comprising:

a load-bearing frame rollably carrying a number of wheels each engaging a corresponding one of said rails, each said wheel comprising a web rotatable about a rotational axis and a pair of side flanges radially extending from and axially spaced-apart along said wheel web so as to define a rail-engaging surface on said wheel web between said spaced-apart side flanges, said web rail-engaging surface being wider than said top edge of said corresponding rail so as to allow a low-friction rolling engagement between said wheel web and said rail top edge;

wherein at least one wheel of said third cart engages a corresponding one of said rails between two wheels of said first cart and at least one wheel of said fourth cart engages a corresponding one of said rails between two wheels of said second cart, with said load-bearing frame of said second cart extending vertically higher than said load-bearing frame of said third cart and with said load-bearing frame of said third cart extending vertically higher than said load-bearing frame of said fourth cart when said first, second, third and fourth carts respectively engage said first and second pairs of rails.

In one embodiment, each one of said first, second, third and fourth carts defines front and rear cart end portions and comprises a front pair of said wheels located at said front cart end and a rear pair of said wheels located at said rear cart end, with said front pair of said wheels of said third cart engaging said first pair of rails between said front and rear pairs of said wheels of said first cart, and with said front pair of said wheels of said fourth cart engaging said second pair of rails between said front and rear pairs of said wheels of said second cart.

In one embodiment, said second and third carts comprise respective co-operating abutment members integrally attached to their respective said load-bearing frames, said co-operating abutment members abutting against each other and preventing displacement of said second cart relative to said third cart before said second cart front cart end portion moves rearwardly beyond said third cart rear cart end portion along said storing lane.

In one embodiment, said push-back storage system further comprises a stop member at said storing lane front end for abutment of at least one of said first, second, third and fourth carts thereon when said at least one of said first, second, third and fourth carts is at said storing lane front end for preventing said first, second, third and fourth carts from rolling beyond said storing lane front end.

The present invention further relates to a push-back storage system comprising a number of storing lanes each defining opposite front and rear ends and each comprising:

a number of pairs of spaced-apart parallel elongated rails extending between said front and rear ends of said storing lane and downwardly inclined from said rear end towards said front end, said pairs of rails being arranged successively from a narrower pair to a wider pair of concentric pairs of rails, each said rail of said pairs of rails comprising a pair of elongated inclined side walls integrally linked at a common elongated top edge; and a number of carts each rollably carried by a corresponding said pair of rails and rollable along said corresponding pair of rails between said storing lane front and rear ends, each said cart comprising a load-bearing frame rollably carrying a number of wheels each engaging a corresponding one of said rails, each said wheel comprising a web rotatable about a rotational axis and a pair of side flanges radially extending from and axially spaced-apart along said wheel web so as to define a rail-engaging surface on said wheel web between said spaced-apart side flanges, said web rail-engaging surface being wider than said top edge of said corresponding rail so as to allow a low-friction rolling engagement between said wheel web and said rail top edge;

wherein said load-bearing frames of said carts being are vertically offset relative to each other when they engage their said corresponding pairs of rails.

In one embodiment, said side flanges of each one of said wheels are inclined so as to form a divergent peripheral channel in said wheel with said wheel web, so as to accommodate said inclined side walls of the corresponding said rail, with a play existing between said inclined side walls of said corresponding rail and said wheel side flanges in at least one position of said wheel when it engages said corresponding rail.

DETAILED DESCRIPTION OF THE EMBODIMENTS

Figure 1:
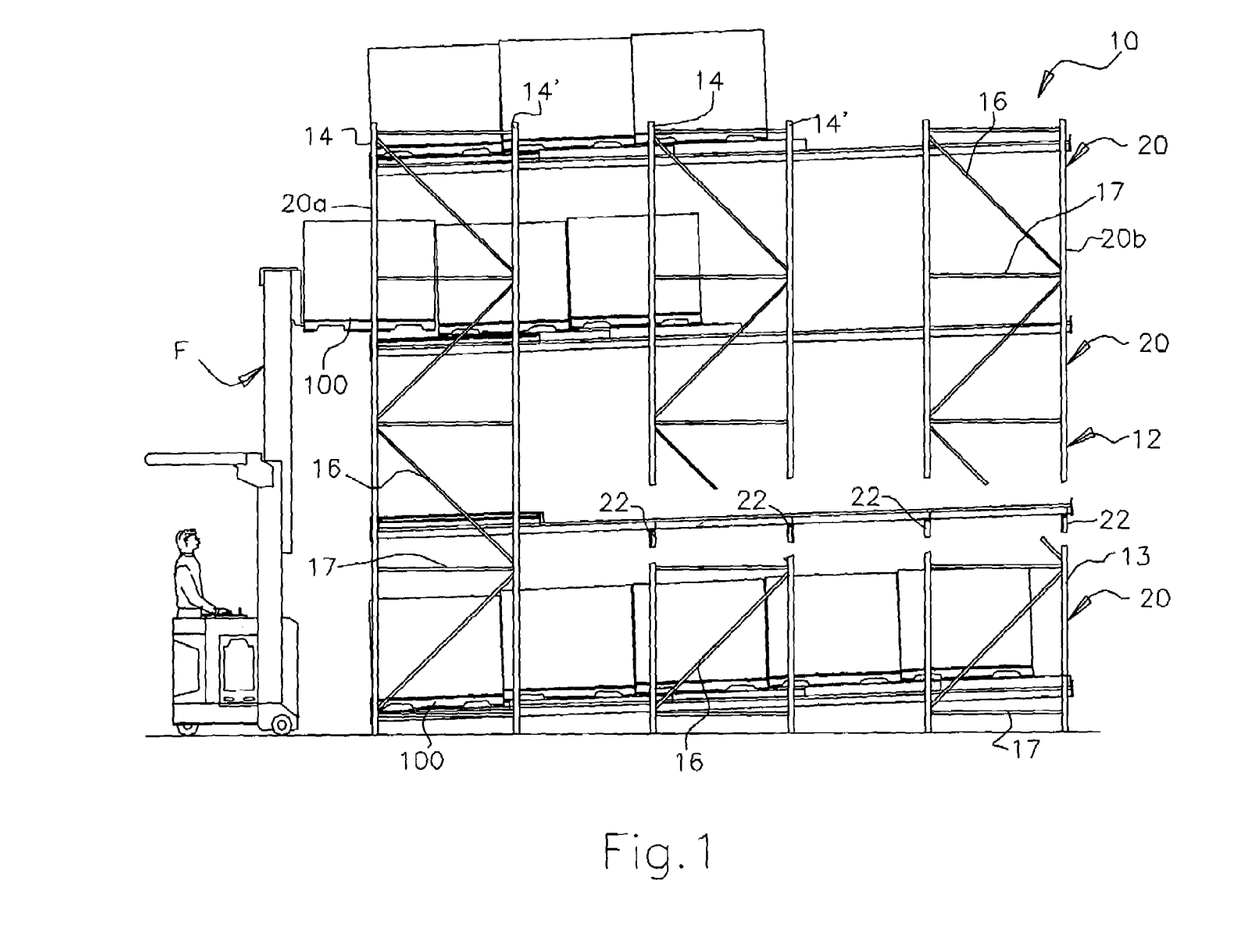
FIG. 1 is a partly broken side elevation of a storage system according to the present invention, in the process of being loaded with an article-loaded pallet and a man-operated forklift, with several pallets being stored on the storage system.

FIG. 1 illustrates a pushback storage system 10 according to the invention, in the process of being loaded with an article-loaded pallet 100 by a man-operated forklift F.

Figure 2:
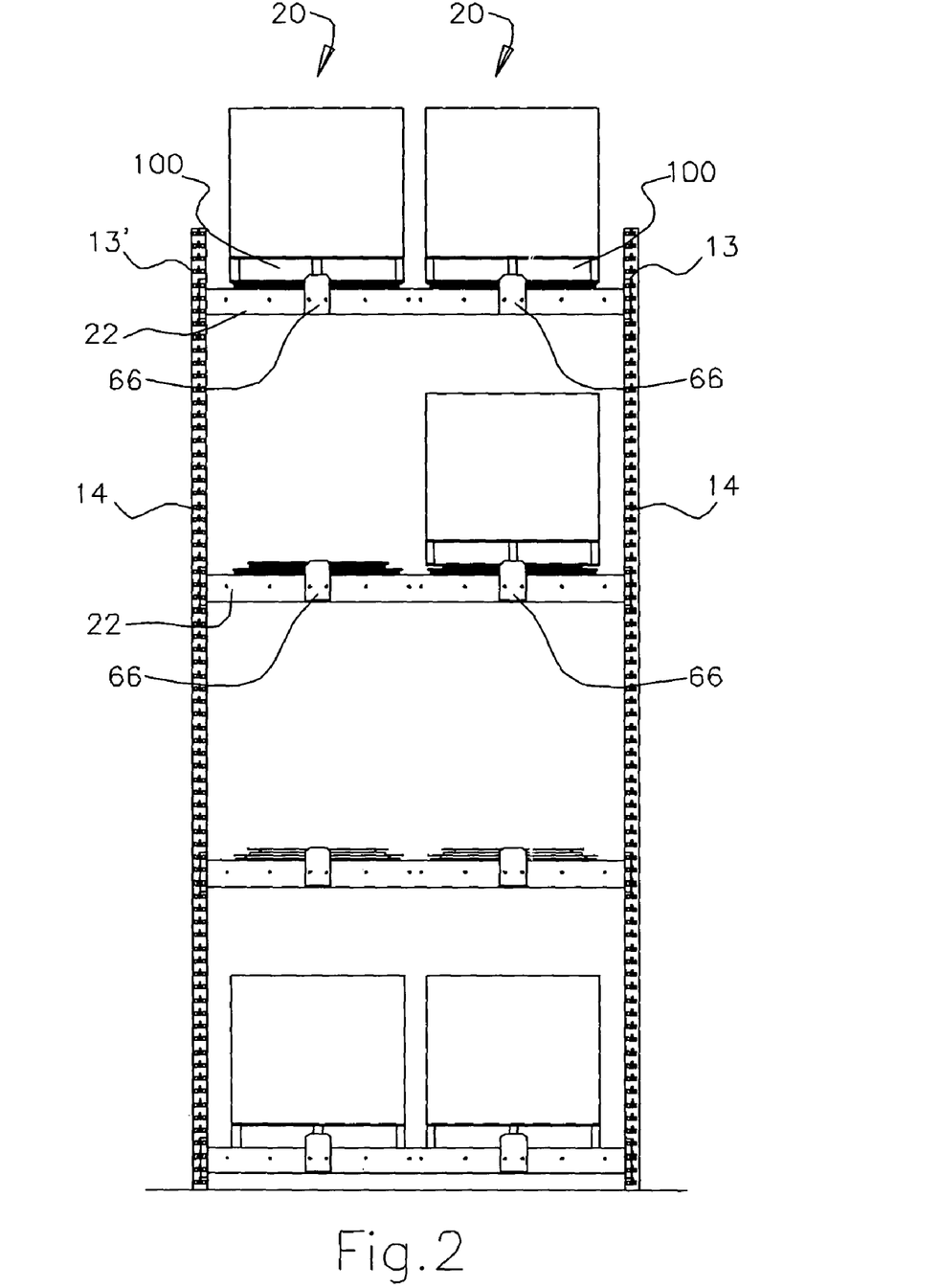
FIG. 2 is a front elevation of the storage system of FIG. 1.
Figure 3:
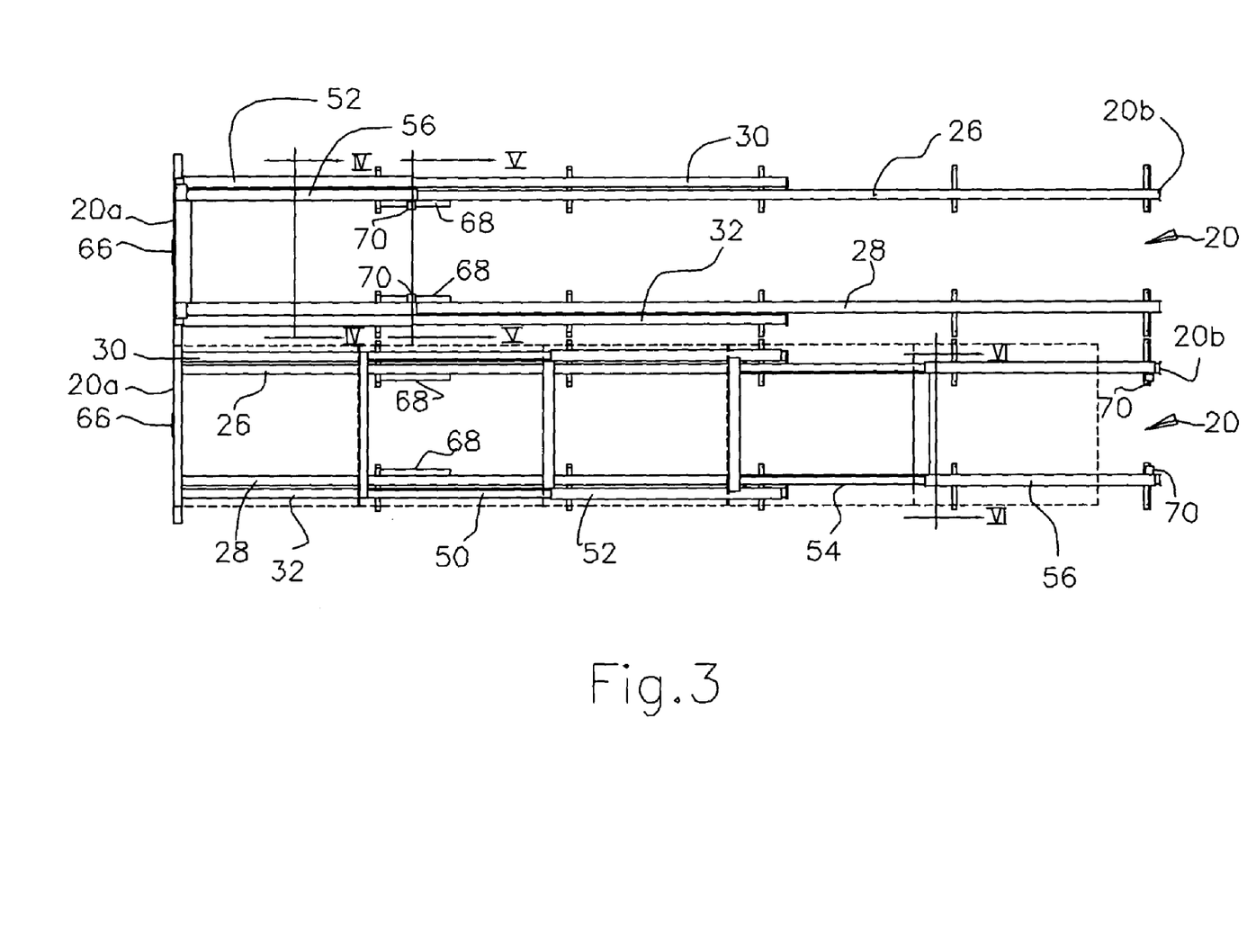
FIG. 3 is an enlarged top plan view of two side-by-side storing lanes of the storage system of FIGS. 1 and 2, showing a top storing lane devoid of any pallets and a bottom storing lane wherein the carts are positioned according to a fully loaded configuration of the storing lane, with the pallets loaded on the carts being shown in dotted lines for clarity of the drawing.

As shown in FIGS. 1–2, storage system 10 comprises a framework 12, comprising two opposite side walls 13, 13'. Each side wall 13, 13' comprises three pairs of ground-resting, upstanding struts 14, 14'. Each strut 14 is linked to the other strut 14' of a same pair by means of horizontal and diagonal crossbars 17 and 16 respectively. Vertically spaced horizontal beams 22 are attached to struts 14, 14' and thus integrally link side walls 13, 13'.

Framework 12 comprises a number of storing lanes 20 each defining an opened front loading end 20*a* and a rear end 20*b*. Storing lanes 20 are disposed by pairs of side-by-side lanes, each pair of lanes 20 being defined over a number of aligned rows of transverse horizontal beams 22. In the annexed drawings, a total of eight storing lanes are shown, vertically spaced apart by pairs.

Each storing lane 20 comprises at least one pair of spaced-apart parallel elongated rails extending between the front and rear ends 20*a*, 20*b* of storing lane 20. More particularly, as shown in FIGS. 3–7 of the annexed drawings, each storing lane 20 comprises two pairs of elongated rails, namely an inner pair of rails 26, 28 located in-between an outer pair of rails 30, 32.

Figure 7:
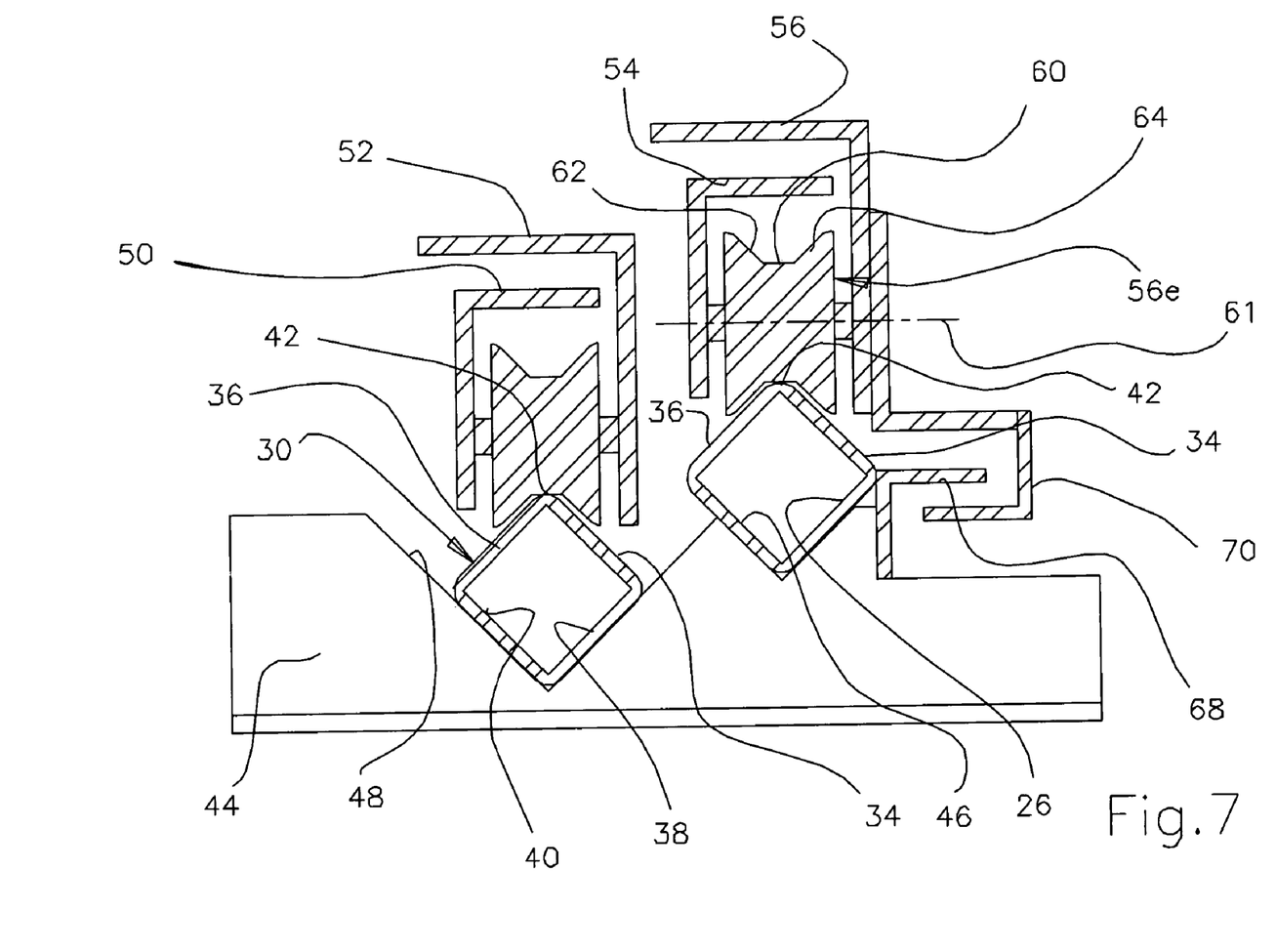
FIG. 7 is an enlarged view of the left-hand side bracket, rails and cart portions of FIG. 5.
Figure 8:
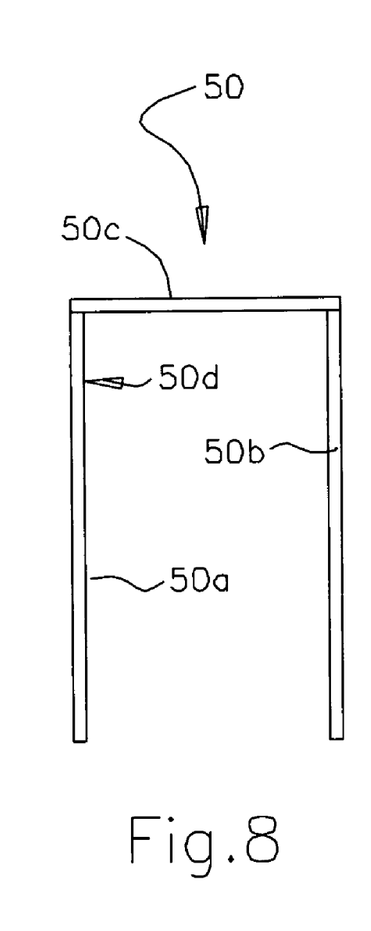
FIGS. 8, 9, 10 and 11 are top plan views of the four carts provided in each storing lane of the storage system of FIGS. 1–7.

Each rail 26, 28, 30, 32, for example rail 30 shown in FIG. 7, is cross-sectionally diamond-shaped, and thus comprises four elongated side walls linked to each other along their edges, namely two upper walls 34, 36 and two lower walls 38, 40. The inclined upper walls 34, 36 are integrally linked at a common elongated substantially sharp top edge 42.

FIGS. 3–7 further show a number of brackets 44 that are fixedly attached to horizontal beams 22 (the latter shown in FIGS. 1 and 2). Each bracket 44 either supports rails 26 and 30 side-by-side or rails 28 32 side-by-side. Each bracket 44, as shown in FIG. 7, comprises a pair of recesses 46, 48 therein, namely an inner recess 46 to receive one rail 26 or 28 of the inner pair of rails 26, 28 and an outer recess 48 to receive one rail 30 or 32 of the outer pair of rails 30, 32. Outer recess 48 is formed vertically lower than the inner recess 46 so that the resulting position of inner rails 26, 28 will be vertically higher than that of outer rails 30, 32.

FIGS. 1–11 show that storage system 10 is provided with a number of carts rollably carried by rails 26, 28, 30, 32. More particularly, four carts 50, 52, 54, 56 engage rails 26, 28, 30, 32, each pair of rails supporting two corresponding carts as detailed hereinafter. Each cart comprises a U-shaped load-bearing frame 50*d*, 52*d*, 54*d*, 56*d* destined to receive an article-loaded pallet 100 thereon, and having a pair of spaced-apart longitudinal girders 50a and 50b, 52a and 52b, 54a and 54b, 56a and 56b integrally linked by a front crossbar 50c, 52c, 54c, 56c at the front extremity of the girders. The cart girders and crossbars have an L-shaped cross-section.

As shown in FIGS. 4–7 and 12–13, each cart 50, 52, 54, 56 rollably carries a number of wheels 50e, 52e, 54e, 56e each engaging a corresponding one of the storing lane rails 26, 28, 30 32. More particularly, each cart defines front and rear cart end portions and comprises a front pair of wheels located at its front cart end portion and a rear pair of wheels located at its rear cart end portion. Each cart wheel, for example wheel 56e shown in figure 7, comprises a cylindrical web 60 rotatable about a rotational axis 61 and a pair of side flanges 62, 64 radially extending from and axially spaced-apart along wheel web 60 so as to define a cylindrical rail-engaging surface on wheel web 60 between the spaced-apart side flanges 62, 64. The cylindrical rail-engaging surface of the wheel web 60 is wider than the top edge 42 of the corresponding rail, namely rail 26 in the case of wheel 56e shown in FIG. 7. Side flanges 62, 64 are inclined to form a divergent peripheral channel in wheel 56e, so as to accommodate the inclined top surfaces 34, 36 of rail 26. A play exists between the inclined top surfaces 34, 36 of rail 26 and the inclined inner surfaces of flanges 62, 64 of wheel 56e.

Figures 12, 13:
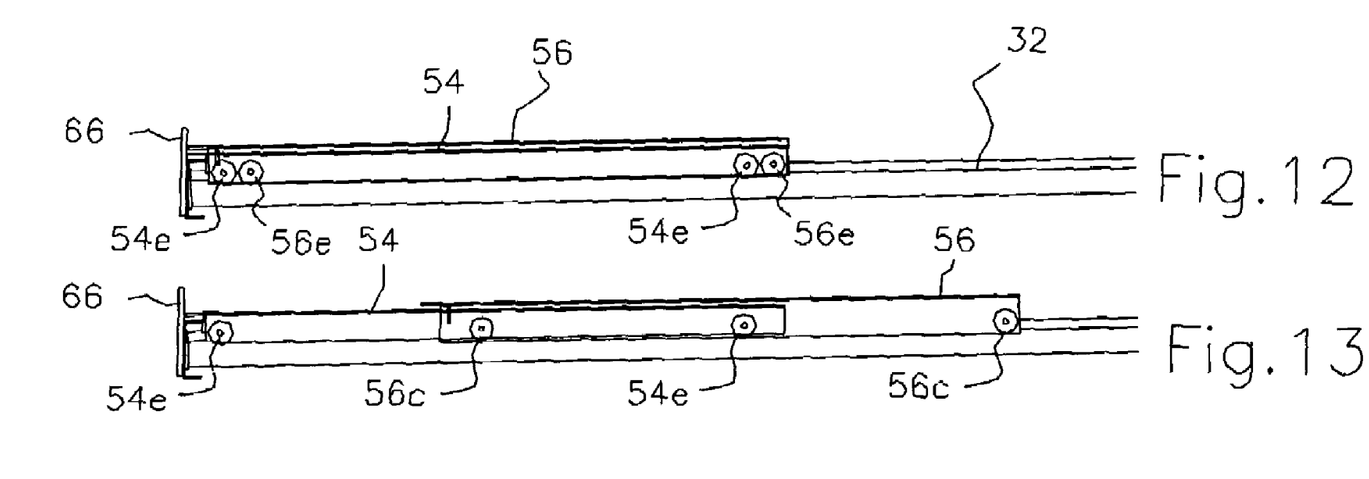
FIGS. 12 and 13 are side elevations of a front portion of a storing lane, sequentially showing the relative displacement of two overlying carts thereon.

The four carts 50, 52, 54, 56 are interconnected to limit, up to a certain extent, the relative movement of each two successive carts. Each pair of carts that engages a same pair of rails, for example carts 54 and 56 as shown in FIGS. 12–13, are interconnected through their wheels. Indeed, the front pair of wheels 56e of cart 56 engages rails 26, 28 between the front and rear pairs of wheels 54e of cart 54. Similarly, the front pair of wheels is 52e of cart 52 engages rails 30, 32 between the front and rear pairs of wheels 50e of cart 50. This inter-engagement of the cart wheels allows cart 52 to move between two limit positions relative to cart 50: a first limit position in which it is located at a same longitudinal position than cart 50 along rails 30, 32, and in which it is located over cart 50 (top track of FIG. 3 and FIG. 12); and a second limit position in which it is located rearwardly of cart 50, with its rear end portion being adjacent the front end portion of cart 50 (bottom track of FIG. 2). Likewise, cart 56 can also move between two limit positions relative to cart 54: a first limit position in which it is located at a same longitudinal position than cart 54 along rails 26, 28, and in which it is located over cart 54 (top track of FIG. 3); and a second limit position in which it is located rearwardly of cart 54, with its rear end portion being adjacent the front end portion of cart 54 (bottom track of FIG. 3).

Figure 9:
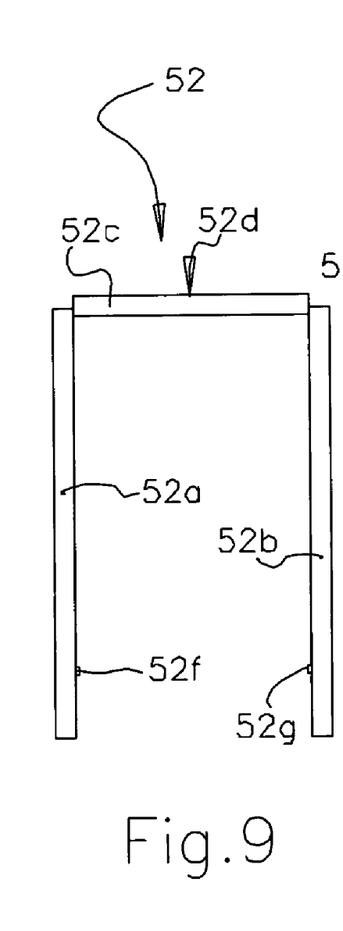
Figure 10:
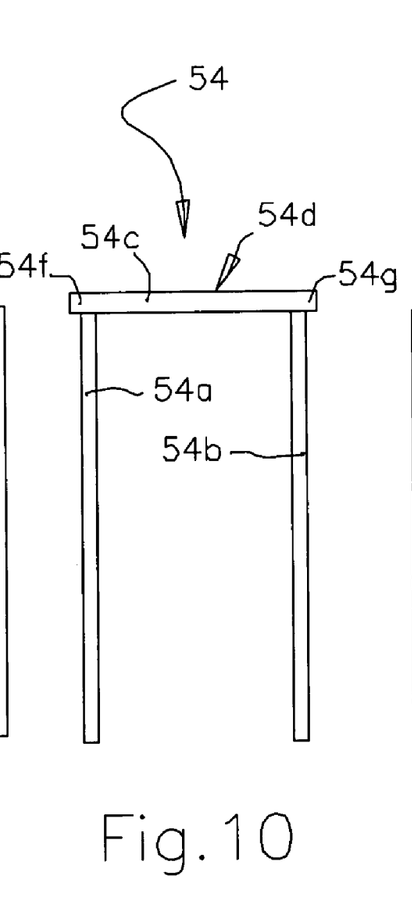
Figure 11:
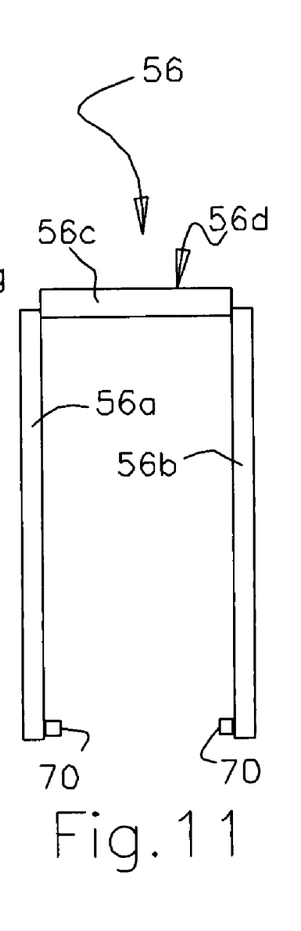

Furthermore, as shown in FIGS. 9 and 10, carts 52 and 54 comprise respective co-operating abutment members integrally attached to their respective load-bearing frames 52d, 54d. More particularly, cart 52 comprises a pair of short inwardly oriented pins 52f, 52g on its side girders 52a, 52b that are destined to abut against the laterally outwardly protruding side flanges 54f, 54g of the front crossbar 54c of cart 54. These co-operating abutment members 52f, 52g and 54f, 54g will abut against each other and prevent longitudinal displacement of cart 54 relative to cart 52 beyond a rear limit position shown in the bottom storing lane of FIG. 3, in which the front end of cart 54 is adjacent the rear end of cart 52.

A stop member 66 in the form of a rigid flat upright pate is fixedly attached to a crossbar 22 at the front end 20a of each storing lane 20 for abutment thereon of at least one cart, for example all carts 50, 52, 54, 56 as shown in the annexed drawings, when carts 50, 52, 54, 56 are at the storing lane front end 20a. This abutment prevents carts 50, 52, 54, 56 from rolling beyond the storing lane front end 20a. In an alternate embodiment where less than all carts (but at least one cart) abut against stop member 66 in their front limit position, then the carts that do not abut against stop member 66 will abut against each other to prevent the carts from rolling frontwardly out of storing lane 20.

In use, palletized articles 100 may be stored in storage system 10 by successively placing a number of palletized articles 100 in each storing lane 20. More particularly, a storing lane 20 may be filled with palletized articles 100 in the following manner.

A forklift truck F will be conventionally used to bring a first pallet 100 loaded with articles to an empty storing lane 20. In an empty storing lane 20, such as the second lane 20 from the bottom of FIG. 1 or the top lane 20 of FIG. 3, all carts 50, 52, 54, 56 are located at a frontmost limit position near the front end 20a of storing lane 20. In this frontmost limit position, all carts 50, 52, 54, 56 are located at a same longitudinal position along lane 20. This is allowed by the particular position of the two pairs of tracks 26, 28 and 30, 32 and by the particular geometry of carts 50, 52, 54, 56.

Figure 4:
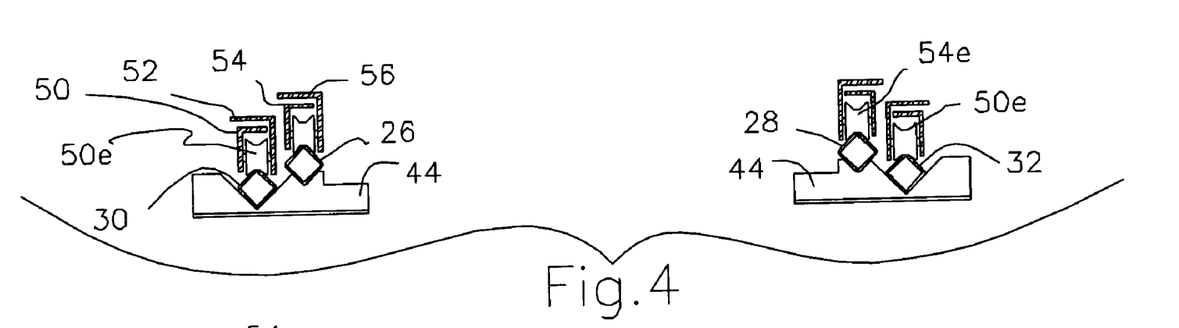
FIGS. 4, 5 and 6 are enlarged cross-sectional views respectively taken along lines IV—IV, V—V and VI—VI of FIG. 3.
Figure 5:
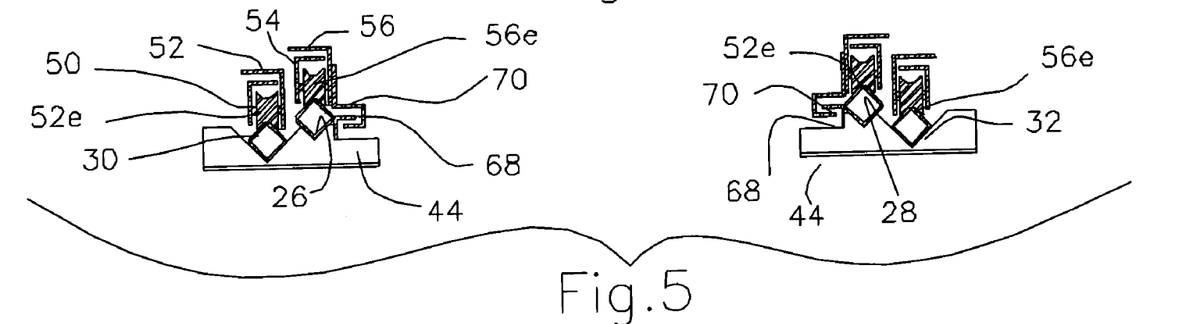
Figure 6:
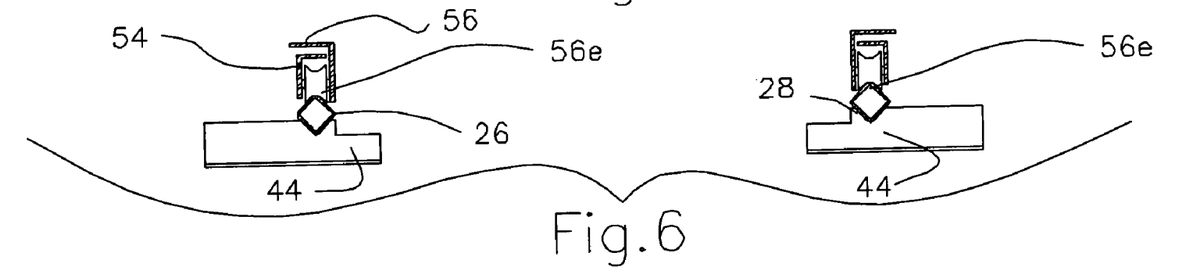

More specifically, carts 50 and 52 both engage outer rails 30, 32, but cart 52 has a U-shaped frame which is higher and can overlap the U-shaped frame of the underlying cart 50, as shown in FIG. 4, due to the respective positions of the cross-sectionally L-shaped bars that form frames 50d, 52d. Furthermore, the fact that the front wheels 52e of cart 52 are located between the front and rear wheels of cart 50 also permit this overlapping position of cart 52 relative to cart 50. Finally, the side girders 50a, 50b of the lowermost cart 50 are positioned outwardly of rails 30, 32, while the side girders 52a, 52b of cart 52 are positioned inwardly of rails 30, 32 (FIGS. 4, 5 and 7).

Carts 54 and 56 both engage the inner rails 26, 28 which are supported in a higher position than outer rails 30, 32 on brackets 44. Carts 54 and 56 are generally narrower than carts 50, 52. As with carts 50 and 52, cart 56 is located in an overlapping position relative to the underlying cart 54.

Upon a first pallet 100 being brought into storing lane 20 through its opened front end 20a, it will be installed and will come to rest on the vertically highest cart, namely first cart 56. Due to the frontward inclination of rails 26, 28, first cart 56 will remain in an abutment position against stop member 66, and the article-loaded pallet 100 will remain accessible at the front end 20a of lane 20.

Upon a second pallet being brought into storing lane 20 through its opened front end 20a, forklift truck F will move this second pallet 100 into storing lane 20 until it abuts against and pushes the first pallet 100 that rests on topmost cart 56. This will push the first pallet back into storing lane 20 by forcibly rolling first cart 56 along inner rails 26, 28, against the upward inclination of rails 26, 28, towards the storing lane rear end 20b, until the second topmost cart 54 is freed. At this point, the second pallet may be placed to rest on the second topmost cart 54, and it will be prevented from accidental egress from storing lane 20 by the abutment of its cart 54 on stop member 66. The first pallet resting on cart 56 will be prevented from moving frontwardly due to its direct abutment against the rear surface of the second pallet.

The third and fourth pallets will be stored in a similar manner. More particularly, the third and fourth pallets will be stored by sequentially placing them on the third and fourth topmost carts 52 and 50 respectively, and by each time pushing back the preceding pallets that rest on their respective carts and that longitudinally successively abut against each other. The pallets may be moved due to the rolling engagement of their respective carts on their corresponding rails. The frontmost cart will abut against stop member 66 in all cases, and all other rearwardly located carts will be prevented from moving frontwardly due to the abutment of their respective pallets on the frontwardly adjacent pallet.

A fifth pallet may be stored in lane 20 by pushing back the first four pallets that rest on their respective carts 56, 54, 52 and 50, and by placing this fifth pallet directly on the underlying inner rails 26, 28. This fifth pallet consequently does not rest on a cart, as opposed to the first four pallets. It is prevented from slidingly falling out of storing lane 20 by its direct abutment on stop member 66, and all other pallets are prevented from frontward movement by their abutment along the inclined rails 26, 28, 30, 32 on the frontwardly adjacent pallet.

The stored pallets may be sequentially retrieved with a forklift truck F by first picking up the fifth pallet that rests directly on rails 26, 28. Upon this fifth pallet being retrieved from storing lane 20, the pallet-loaded carts 50, 52, 54, 56 will frontwardly roll along their corresponding rails 26, 28, 30, 32 under the effect of the gravity due to the frontwardly downward rail inclination, until the frontmost cart 50 abuts against stop member 66. All the other pallets 100 may then sequentially be retrieved, in a last-in first-out order. Each pallet retrieved will allow the other pallets to move frontwardly towards the storing lane front end 20a, with the carts 50, 52, 54, 56 being gradually positioned in their respective frontmost, overlapping position as described hereinabove as the pallets are being retrieved.

According to the present invention, the rail diamond-shaped geometry in which the rails have a single top relatively sharp load-bearing edge 42 with inclined top side surfaces 34, 36, in combination with the fact that the cart wheel webs 60 are wider than the top edge 42 of the rails, allows for a reduced friction engagement of the cart wheels 50e, 52e, 54e, 56e on their corresponding rails 26, 28, 30, 32. Indeed, in an optimal cart rolling condition, a single point of contact will exist between the cart wheels and the underlying load-bearing rails, namely at the punctual intersection between the top edge 42 and the wheel web 60. In practice, it is understood that the carts will in fact move slightly to one side and the other as they roll along their rails, resulting in occasional contact between the wheel side flanges 62, 64 and the rail side surfaces 34, 36. This additional contact between wheel flanges 62, 64 and rail side surfaces 34, 36 is helpful in that it guides the carts along the rails and prevents them from falling off. However, friction between the cart wheels and the rails will remain at a low level due to generally small load-bearing contact surfaces between wheels and rails.

Such a lower friction between the cart wheels and the rails allow the rails to have a lesser inclination while still allowing the loaded carts to automatically roll along the rails towards the front end 20a of the storing lane 20, without being slowed or stopped by friction forces. Also, the lesser inclination of the rails will require less force from the forklift truck F to push back a same load on a same number of loaded carts. This may allow use of storing lanes that comprise a greater number of carts, for a same pallet load.

Tests have shown that rail inclinations of 1,7° may be efficiently used with the storage system according to the present invention, whereas prior art push-back storage systems were limited to rail inclinations varying between 2° and 4° for same loads to be stored.

Another advantage of the inclined top surfaces on rails 26, 28, 30, 32 is that macroparticulate debris falling on the rails is likely to slide along the inclined side surfaces of rails 26, 28, 30, 32 and fall off from the rails. This helps prevent the wheels from eventually being hindered by the presence of such macroparticulate debris on the rails.

To prevent the front end of the topmost cart 56 from tilting downwardly when a loaded pallet is installed thereon, a pair of short L-shaped retaining plates 68 (FIGS. 3, 5, 7 and 11) are fixedly attached to the inner edges of inner rails 26, 28. These retaining plates 68 loosely engage corresponding channels formed in short C-shaped fingers 70 fixedly attached on the inner portion of uppermost cart 56 near the rear end thereof. Retaining plates 68 are located near the first bracket 44 along inner rails 26, 28, at a fixed longitudinal position that registers with that of the fingers 70 of cart 56 when cart 56 is in its frontmost position. The other carts 54, 52, 50 will be prevented from tilting due to the fact that their respective U-shaped frames are located under the frame of an overlying cart—this overlying cart having been pushed back to free the cart to be loaded although the rear end of the cart to be loaded will remain under the front end of this overlying, rearwardly adjacent cart. This underlying position of the third cart 52 is obtained by means of the side flanges 54f, 54g of front crossbar 54c of cart 54 that project laterally over the rear end portions of the side girders 52a, 52b of cart 52.

It is understood that although a storage system comprising a determined number of storing lanes has been shown in the annexed drawings, the storage system could comprise a single storing lane or any suitable number of storing lanes. Likewise, although each storing lane has been shown as comprising four carts in the embodiment of the invention shown in the annexed drawings, it is understood that each storing lane could comprise any suitable number of carts, with each pair of rails supporting a single one or more carts.

The embodiments of the present invention, in which an exclusive property or privilege is claimed, are defined as follows:

1. A push-back storage system comprising:
   an elongated storing lane defining opposite front and rear ends;
   at least one pair of spaced-apart parallel elongated rails extending between said front and rear ends of said storing lane and being inclined downwardly from said rear end towards said front end, each said rail comprising a pair of elongated inclined side walls integrally linked at a common elongated load-bearing top edge; and
   at least one cart rollably carried by said pair of rails and rollable along said pair of rails between said storing lane front and rear ends, said cart comprising a load-bearing frame rollably carrying a number of wheels each engaging a corresponding one of said rails, each said wheel comprising a cylindrical web rotatable about a rotational axis and a pair of side flanges radially extending from and axially spaced-apart along said wheel web so as to define a cylindrical rail-engaging surface on said wheel web between said spaced-apart side flanges, said web rail-engaging surface being wider than said top edge of said corresponding rail so as to allow a single contact-point, low-friction rolling engagement between said wheel web and said rail top edge.

2. A push-back storage system as defined in claim 1, wherein said side flanges of each one of said wheels are inclined so as to form a divergent peripheral channel in said wheel with said wheel web, so as to accommodate said inclined side walls of the corresponding said rail.

3. A push-back storage system as defined in claim 2, wherein each said rail has a diamond-shaped cross-section.

4. A push-back storage system as defined in claim 2, wherein said frame of said at least one cart is U-shaped and defines a pair of spaced-apart longitudinal girders integrally linked by a front cross-bar at one extremity of said girders.

5. A push-back storage system as defined in claim 2, further comprising a second cart in addition to said at least one cart, said second cart being rollably carried by said pair of rails and rollable along said pair of rails between said storing lane front and rear ends, said second cart comprising:
   a load-bearing frame rollably carrying a number of wheels each engaging a corresponding one of said rails, each said wheel comprising a web rotatable about a rotational axis and a pair of side flanges radially extending from and axially spaced-apart along said wheel web so as to define a rail-engaging surface on said wheel web between said spaced-apart side flanges, said web rail-engaging surface being wider than said top edge of said corresponding rail so as to allow a low-friction rolling engagement between said wheel web and said rail top edge; wherein at least one wheel of said second cart engages one of said rails between two wheels of said at least one cart, and wherein said load-bearing frame of said second cart extends vertically lower than said load-bearing frame of said first cart.

6. A push-back storage system as defined in claim 2, further comprising a stop member at said storing lane front end for abutment of said at least one cart thereon when said at least one cart is at said storing lane front end for preventing said at least one cart from rolling beyond said storing lane front end.

7. A push-back storage system comprising:
   an elongated storing lane defining opposite front and rear ends;
   a first pair of spaced-apart parallel elongated rails extending between said front and rear ends of said storing lane and being downwardly inclined from said rear end towards said front end, and a second pair of spaced-apart parallel elongated rails extending parallel to said first pair of rails between a first position at said front end of said storing lane and a second position located away from said front end towards said rear end of said storing lane, said second pair of rails being downwardly inclined from said second position towards said first position, each said rail of said first and second pairs of rails comprising a pair of elongated inclined side walls integrally linked at a common elongated load-bearing top edge; and
   a first cart rollably carried by said first pair of rails and rollable along said first pair of rails between said storing lane front and rear ends, and a second cart carried by said second pair of rails and rollable along said second pair of rails between said first and second positions, each one of said first and second carts comprising a load-bearing frame rollably carrying a number of wheels each engaging a corresponding one of said rails, each said wheel comprising a cylindrical web rotatable about a rotational axis and a pair of side flanges radially extending from and axially spaced-apart along said wheel web so as to define a cylindrical rail-engaging surface on said wheel web between said spaced-apart side flanges, said web rail-engaging surface being wider than said top edge of said corresponding rail so as to allow a single contact-point, low-friction rolling engagement between said wheel web and said rail top edge;
   wherein said first pair of rails is located between said second pair of rails, with said load-bearing frame of said first cart extending vertically higher than said load-bearing frame of said second cart when said first and second carts respectively engage said first and second pairs of rails.

8. A push-back storage system as defined in claim 7, wherein said side flanges of each one of said wheels are inclined so as to form a divergent peripheral channel in said wheel with said wheel web, so as to accommodate said inclined side walls of the corresponding said rail.

9. A push-back storage system as defined in claim 8, wherein said first pair of rails is vertically higher than said second pair of rails at any given longitudinal position in said storing lane.

10. A push-back storage system as defined in claim 9, wherein said load-bearing frame of each of said first and second carts is U-shaped and defines a pair of spaced-apart longitudinal girders integrally linked by a front cross-bar at one extremity of said girders.

11. A push-back storage system as defined in claim 10, further comprising a third cart rollably carried by said first pair of rails and rollable along said first pair of rails between said storing lane front and rear ends, and a fourth cart rollably carried by said second pair of rails and rollable along said second pair of rails between said first and second position, each one of said third and fourth carts comprising:
   a load-bearing frame rollably carrying a number of wheels each engaging a corresponding one of said rails, each said wheel comprising a web rotatable about a rotational axis and a pair of side flanges radially extending from and axially spaced-apart along said wheel web so as to define a rail-engaging surface on said wheel web between said spaced-apart side flanges, said web rail-engaging surface being wider than said top edge of said corresponding rail so as to allow a low-friction rolling engagement between said wheel web and said rail top edge;
   wherein at least one wheel of said third cart engages a corresponding one of said rails between two wheels of said first cart and at least one wheel of said fourth cart engages a corresponding one of said rails between two wheels of said second cart, with said load-bearing frame of said second cart extending vertically higher than said load-bearing frame of said third cart and with said load-bearing frame of said third cart extending vertically higher than said load-bearing frame of said fourth cart when said first, second, third and fourth carts respectively engage said first and second pairs of rails.

12. A push-back storage system as defined in claim 11, wherein each one of said first, second, third and fourth carts defines front and rear cart end portions and comprises a front pair of said wheels located at said front cart end and a rear pair of said wheels located at said rear cart end, with said front pair of said wheels of said third cart engaging said first pair of rails between said front and rear pairs of said wheels of said first cart, and with said front pair of said wheels of said fourth cart engaging said second pair of rails between said front and rear pairs of said wheels of said second cart.

13. A push-back storage system as defined in claim 12, wherein said second and third carts comprise respective co-operating abutment members integrally attached to their respective said load-bearing frames, said co-operating abutment members abutting against each other and preventing displacement of said second cart relative to said third cart before said second cart front cart end portion moves rearwardly beyond said third cart rear cart end portion along said storing lane.

14. A push-back storage system as defined in claim 13, further comprising a stop member at said storing lane front end for abutment of at least one of said first, second, third and fourth carts thereon when said at least one of said first, second, third and fourth carts is at said storing lane front end for preventing said first, second, third and fourth carts from rolling beyond said storing lane front end.

15. A push-back storage system comprising a number of storing lanes each defining opposite front and rear ends and each comprising:

a number of pairs of spaced-apart parallel elongated rails extending between said front and rear ends of said storing lane and downwardly inclined from said rear end towards said front end, said pairs of rails being arranged successively from a narrower pair to a wider pair of concentric pairs of rails, each said rail of said pairs of rails comprising a pair of elongated inclined side walls integrally linked at a common elongated load-bearing top edge; and a number of carts each rollably carried by a corresponding said pair of rails and rollable along said corresponding pair of rails between said storing lane front and rear ends, each said cart comprising a load-bearing frame rollably carrying a number of wheels each engaging a corresponding one of said rails, each said wheel comprising a cylindrical web rotatable about a rotational axis and a pair of side flanges radially extending from and axially spaced-apart along said wheel web so as to define a cylindrical rail-engaging surface on said wheel web between said spaced-apart side flanges, said web rail-engaging surface being wider than said top edge of said corresponding rail so as to allow a single contact-point, low-friction rolling engagement between said wheel web and said rail top edge;

wherein said load-bearing frames of said carts being are vertically offset relative to each other when they engage their said corresponding pairs of rails.

16. A push-back storage system as defined in claim 15, wherein said side flanges of each one of said wheels are inclined so as to form a divergent peripheral channel in said wheel with said wheel web, so as to accommodate said inclined side walls of the corresponding said rail.

* * * * *